Figure 1:
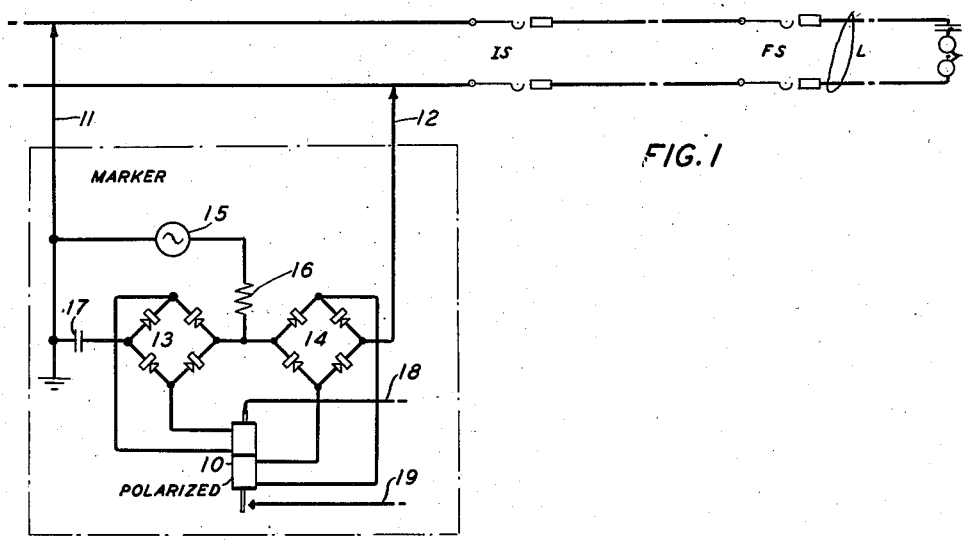

Dec. 27, 1938.   F. E. BLOUNT ET AL   2,141,373
ELECTRICAL TESTING SYSTEM
Filed July 1, 1937

INVENTORS: F. E. BLOUNT
P. HUSTA
BY
ATTORNEY

Patented Dec. 27, 1938

2,141,373

UNITED STATES PATENT OFFICE 2,141,373

ELECTRICAL TESTING SYSTEM

Frank E. Blount, Cedar Grove, N. J., and Philip Husta, Great Neck, N. Y., assignors to Bell Telephone Laboratories, Incorporated, New York, N. Y., a corporation of New York Application July 1, 1937, Serial No. 151,407

5 Claims. (Cl. 179—175.3)

This invention relates to testing devices and particularly to means for testing the continuity of electrical connections.

It is the object of the invention to provide a more reliable arrangement for testing the continuity of an electrical connection and distinguishing between the impedance of a continuous connection as compared with the impedance of an open connection and moreover without causing the operation of any electrical apparatus included in the connection.

This invention is a circuit testing device comprising a test relay having an operating winding connected in series with a source of alternating current, a full-wave rectifier and the circuit path the continuity of which is being tested, and having a biasing winding connected in series with the source of alternating current, a full-wave rectifier and a phase-controlling condenser.

A clear and complete understanding of the invention may be obtained by considering testing devices arranged in accordance with the invention, two such arrangements being shown schematically in the drawing which forms a part of this specification. The invention is not limited in its application to the specific arrangements shown but is generally applicable to all circuit arrangements used for testing the continuity of electrical paths.

Figure 2:
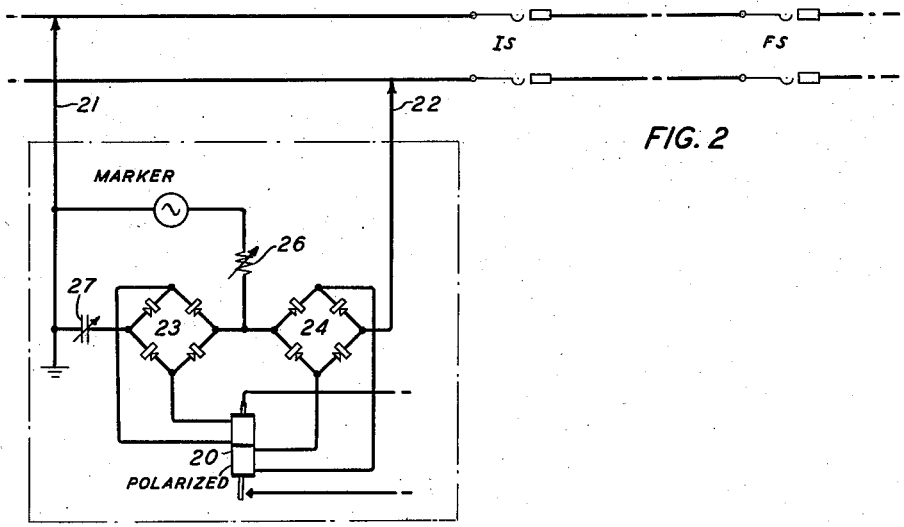

Referring to the drawing,

Fig. 1 shows a portion of an automatic telephone system comprising a marker, an intermediate selector IS, a final selector FS, a subscriber's line L and the ringer at the subscriber's station, and in the marker a testing device comprising a test relay 10 and full-wave rectifiers 13 and 14; and Fig. 2 also shows a portion of an automatic telephone system comprising a marker, an intermediate selector IS, a final selector FS, a subscriber's line L, and in the marker a testing device comprising a test relay 20 and full-wave rectifiers 23 and 24.

The subscriber's station connected to line L is represented by the ringer and ringing condenser which are normally bridged across the line, the other station apparatus being omitted. The selector switches IS and FS may be of any known type arranged for marker control. Reference may be had to the W. W. Carpenter Patents No. 2,093,117, Sept. 14, 1937, and No. 2,089,921, Aug. 10, 1937, for a complete description of an automatic telephone system comprising marker controlled switches for establishing connections with called lines. The marker is represented by the broken line enclosure within which is shown a testing device arranged in accordance with this invention.

Assuming a selector IS to have been operated under the control of an associated marker to select and seize a final selector FS and the final selector to have been operated under the control of the marker to select, test and seize the terminals of a called line L, the continuity of the circuit path through switches IS and FS to the line L is tested by closing the testing circuit through conductors 11 and 12 in Fig. 1 or conductors 21 and 22 in Fig. 2 to the talking conductors of selector IS. The upper winding of relay 10 is a biasing winding energized in series with the alternating-current source 15, resistor 16, full-wave rectifier 13 and condenser 17. Relay 10 is a polarized relay so that energization of the biasing winding alone will not cause operation of the relay. The lower, operating winding of relay 10 is connected in series with alternating-current source 15, resistor 16, full-wave rectifier 14, conductors 11 and 12 to the talking conductors of selector IS. With a closed connection through the talking conductors of switches IS and FS and the line L, the test relay 10 is in series with the ringer of the called station, and the current is sufficient to operate relay 10 but is insufficient due to the inclusion of resistor 16, to operate the ringer at the called station. But if this connection is incomplete, due to a fault at any point, the impedance offered by the capacity between each of the conductors and the other and to ground is so high that there is insufficient current through the lower winding of relay 10 to cause its operation. The biasing winding and operating winding of relay 10 are alike, but condenser 17 limits the current through the biasing winding and is of such a value that the current through the biasing winding is 180° out of phase with the current in the operating winding when the circuit path being tested offers the most severe non-operate condition, that is the lowest open circuit impedance. The resistor 16 offers a high impedance to the current through both windings and since the biasing and operating circuits of relay 10 are in parallel, a reduction in the impedance of the circuit path under test not only increases the current in the operating winding but also decreases the current in the biasing winding. As the operating time of the test relay is dependent upon the difference between the operating and biasing currents and the length of time required to build up to the operate value on the rectified current wave, a faster operation is obtained when the impedance of the circuit path under test is less than the maximum closed-circuit impedance. This is of considerable advantage when less than the maximum closed-circuit impedance is encountered in the larger part of the tests made. The use of the biasing winding rather than a mechanical bias also prevents the release of the test relay between pulsations of the rectified operating current.

When test relay 10 operates, it closes a circuit over conductors 18 and 19 to permit the freeing of the marker for use on other calls. But if relay 10 fails to operate, the marker releases the selector IS and FS and tries to set up a closed connection to the line L through a different switch path.

The testing circuit shown in Fig. 2 is similar to that of Fig. 1 except that the condenser for controlling the difference in phase between the current in the biasing and operating windings of the test relay 20 is a variable condenser. The resistor 26 is also shown as being variable thereby enabling an accurate adjustment to give 180° difference in phase between the current in the biasing and operating windings of relay 20 when the circuit path under test offers the most severe nonoperate condition.

What is claimed is:

1. A testing apparatus for testing a circuit path, said testing apparatus comprising a source of alternating current, a condenser, a test relay having an operating winding and a biasing winding, and full-wave rectifiers, the operating winding being connected in series with said source, the circuit path under test and one of said rectifiers, and the biasing winding being connected in series with said source and condenser and another of said rectifiers.

2. A testing apparatus for testing a circuit path, said testing apparatus comprising a source of alternating current, a test relay having two like windings, a condenser, rectifiers, a biasing circuit comprising said source, said condenser, one of said rectifiers and one of the windings of said relay, and a test circuit comprising said source, another of said rectifiers, the other of said windings and the circuit path under test, said condenser being effective to control the phase relation between the current in said biasing and operating windings.

3. In a telephone system, a subscriber's line, switching means for establishing a talking connection with said line, and testing means for testing the continuity of the connection, said testing means comprising a source of alternating current, a condenser, two full-wave rectifiers, and a test relay having a biasing winding connected in series with said source, condenser and one of said rectifiers and having an operating winding connected in series with said source, the other of said rectifiers and said talking connection.

4. In combination, a circuit path, the continuity of which is to be tested, and testing means comprising a source of alternating current, a high resistance element, a condenser, two full-wave rectifiers, and a test relay having a biasing winding connected in series with said source, condenser and high resistance element and having an operating winding connected in series with said source, said high resistance element, the other of said rectifiers and said circuit path.

5. In combination, a circuit path the continuity of which is to be tested, and testing means comprising a source of alternating current, a resistor, a condenser, full-wave rectifiers and a test relay having an operating winding and a biasing winding connected in parallel, said operating winding being connected in series with said source, resistor, one of said rectifiers and said circuit path and said biasing winding being connected in series with said source, resistor, the other of said rectifiers and said condenser.

FRANK E. BLOUNT.
PHILIP HUSTA.